United States Patent [19]
Kotake et al.

[11] Patent Number: 6,059,534
[45] Date of Patent: May 9, 2000

[54] CONTROL SYSTEM FOR HYDRAULIC DRIVE

[75] Inventors: Nobukazu Kotake; Donald Innes Wallace, both of Chester-le-Street, United Kingdom

[73] Assignee: Komatsu UK Ltd, County Durham, United Kingdom

[21] Appl. No.: 09/117,687

[22] PCT Filed: Feb. 3, 1997

[86] PCT No.: PCT/GB97/00299

§ 371 Date: Aug. 3, 1998

§ 102(e) Date: Aug. 3, 1998

[87] PCT Pub. No.: WO97/29308

PCT Pub. Date: Aug. 14, 1997

[30] Foreign Application Priority Data

Feb. 7, 1996 [GB] United Kingdom ............... 9602509

[51] Int. Cl.⁷ .................................................. F04B 49/00
[52] U.S. Cl. ............................................ 417/15; 180/307
[58] Field of Search ........................ 417/15; 180/307; 74/331, 733.1

[56] References Cited

U.S. PATENT DOCUMENTS

| | | | |
|---|---|---|---|
| 3,637,036 | 1/1972 | Swisher, Jr. et al. | 180/307 |
| 4,899,542 | 2/1990 | Iino | 60/487 |
| 4,947,687 | 8/1990 | Martini et al. | 74/733.1 |
| 4,983,149 | 1/1991 | Kita | 475/76 |
| 5,150,628 | 9/1992 | Alfredsson | 74/330 |
| 5,493,938 | 2/1996 | Park | 74/733.1 |
| 5,819,587 | 10/1998 | Leber et al. | 74/331 |

*Primary Examiner*—Teresa Walberg
*Assistant Examiner*—Vinod D Patel
*Attorney, Agent, or Firm*—Larson & Taylor

[57] ABSTRACT

A hydraulic drive to, for example, a wheeled excavator comprises two motors (4, 6) connectable to the input side of a gearbox (8) whereby each motor (4, 6) can apply a driving force to a load connected to the output side of the gearbox (8), one motor (6) being selectively disconnectable from the load independently of the other motor (4) by means of a clutch (10). A control system for effecting said disconnection comprises a hydraulic pump (20) drive n by the gearbox (8) to be rotated at a speed proportional to that of the other motor (4), pressure-sensing means (24) for detecting the pressure of fluid displaced by the pump (20), and control means (28) for achieving selective actuation of the clutch (10) such that, when the sensing means (24) detect a pressure associated with a predetermined speed of the other motor (4) at which the drive from the one motor (6) becomes redundant, the control means (28) operate to disconnect the one motor from the gearbox (8).

6 Claims, 3 Drawing Sheets

CONTROL SYSTEM FOR HYDRAULIC DRIVE

TECHNICAL FIELD

This invention relates to a control system for a hydraulic drive, and more specifically to a control system for a hydraulic drive such as might be used to drive a wheeled excavator.

BACKGROUND ART

The drive train of a wheeled excavator typically includes a diesel engine that drives, among other things, a variable displacement hydraulic piston pump. This pump provides hydraulic fluid under pressure required to drive one or more hydraulic motors, that in turn drive some or all of the wheels of the excavator, typically via a reduction gearbox. The pump may also supply hydraulic motors and/or hydraulic cylinders provided to control other components of the excavator, such as the boom, the arm, the bucket, or the like.

In one known hydraulic drive system for a wheeled excavator, the wheels of the excavator are driven by a single hydraulic motor through a constant mesh, non-synchro mesh, multi-speed gearbox. Although this arrangement is very efficient, it suffers from the drawback that excavators employing this system are not particularly operator friendly. In particular, because the gearbox is a non-synchromesh box, it is necessary to bring the excavator to a complete standstill before changing gear.

A second known hydraulic drive system for a wheeled excavator addresses the above problem by using a "power-shift", constant mesh, multi-speed gearbox, through which the wheels of the excavator are driven by a single hydraulic motor. This system is easier to use than a system with a non-synchro box, the "power-shift" gearbox enabling gear changes to be made while the vehicle is moving. However, the gearbox used in this second system is necessarily more complex than that of the first system, resulting in a more expensive and less efficient hydraulic drive.

A third known hydraulic drive system for a wheeled excavator provides for further ease of use whilst avoiding the expense and complexity of the "power-shift" gearbox. This third system incorporates two drive motors both of which are variable displacement motors and one of which is capable of zero minimum displacement.

More particularly, this system includes one high speed, low torque hydraulic motor and one low speed, high torque hydraulic motor, the low speed motor being capable of being set to zero displacement. Both the motors are variable displacement hydraulic motors and are engaged with the input side of a single ratio, reduction gearbox, via which, in combination, they drive wheels of the excavator. The "gear change" is accomplished by altering the displacement of the motors, and thus requires minimal input from the operator. This arrangement is therefore easier to use than either of the first or the second above mentioned hydraulic drive arrangements.

However, while being easy to use, this third arrangement is more expensive than the first described arrangement. Although the gearbox is simple, it is necessary to use two motors. Additionally, and most significantly, the efficiency of this third arrangement is lower than that of the first and second arrangements.

In order to overcome this problem and to improve the efficiency of the system, it has been proposed to introduce a clutch between the low speed motor and the gearbox arranged to disengage said motor from the drive train during travel once the low speed motor becomes redundant to drive of the vehicle.

However, control of this clutch, if operated on the move, has heretofore been achieved using a sophisticated control system to operate the clutch at precisely the correct moment—i.e. when the displacement of the low speed motor is zero, and when the rotational speed thereof is less than a predetermined value. It has so far proved difficult to provide a suitable clutch control system of commercial viability.

DISCLOSURE OF THE INVENTION

It would be desirable to be able to provide a clutch control system for a two motor hydraulic drive arrangement of simpler and more economic design than heretofore.

The hydraulic drive to which the control system of the invention is applicable comprises first and second motors connectable to the input side of a gearbox, the output side of the gearbox being connected to a load whereby each of said motors can apply a driving force to the load, one of said motors being capable of selective connection to and disconnection from the load by means of a clutch independently of the other motor while the load is being driven.

According to the present invention there is provided a control system for an hydraulic drive as hereinbefore defined, the control system comprising a hydraulic pump driven by an output from the gearbox such that the pump is rotated at a speed which is proportional to the speed at which the other hydraulic motor is operating, pressure-sensing means for detecting the pressure of fluid displaced by said pump, and control means for controlling the flow of fluid to an hydraulic actuator interconnected with, to enable selective actuation of, the clutch, the arrangement being such that, when the pressure sensing means detects a pressure associated with a predetermined rotational speed of the other motor at which the drive from the one motor becomes redundant, the control means operate the hydraulic actuator to disconnect the one motor from the gearbox.

Conveniently, the control system includes an orifice of known cross-sectional area through which fluid from the hydraulic pump is displaced, the pressure of fluid on the pump side of said orifice actuating said control means.

Preferably, the control means comprises a two position valve which controls flow of fluid to the hydraulic actuator which, in turn, actuates the clutch to disconnect the one motor from the gearbox at said predetermined rotational speed of the other motor.

Most preferably, the control system is designed with some hysteresis built in such that the one motor is disconnected from the gearbox when the speed of the other motor reaches a predetermined first value and is reconnected when that speed drops below a second value, the second value being lower than the first value. This avoids the situation that would occur if the first and second values were equal, of the clutch continuously engaging and disengaging if the speed of the other motor was hovering about that value.

It is further preferred that the actuator moves to change the condition of the one motor as quickly as possible to prevent heat build-up within the clutch that would occur during partial engagement.

Thus an excavator incorporating a control system according to the invention has the potential to be taken from full speed to almost stopped while maintaining maximum pulling power, and back to full speed again, with minimal input from the operator, the control system itself being easy to operate and of relatively simple, and therefore commercially viable construction.

DESCRIPTION OF PREFERRED EMBODIMENT

Figure 1:
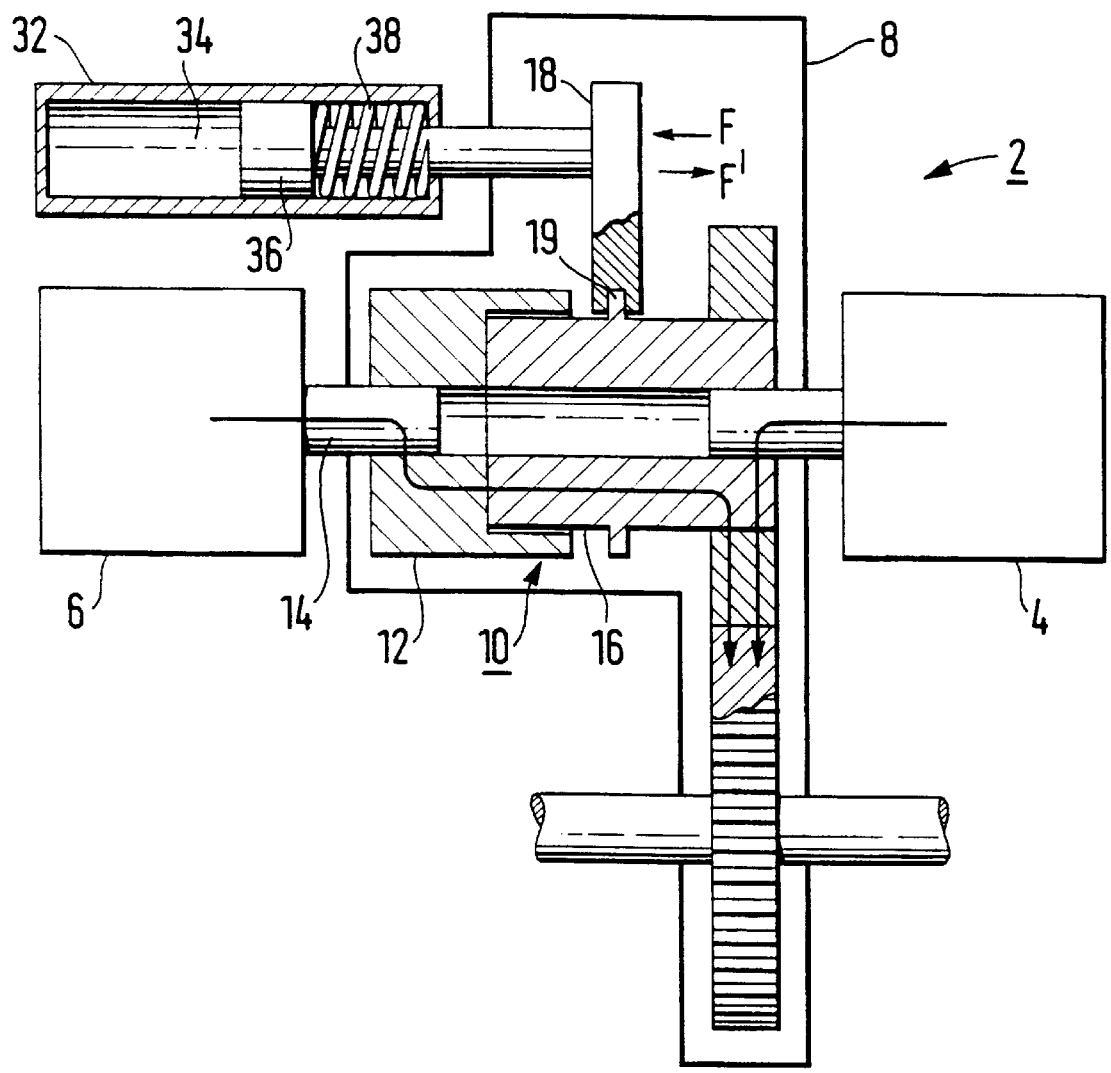
FIGS. 1 and 2 show schematically part of an hydraulic drive under the control of a system according to the invention with the one motor engaged with the load to be driven, and disengaged from the load to be driven respectively.
Figure 2:
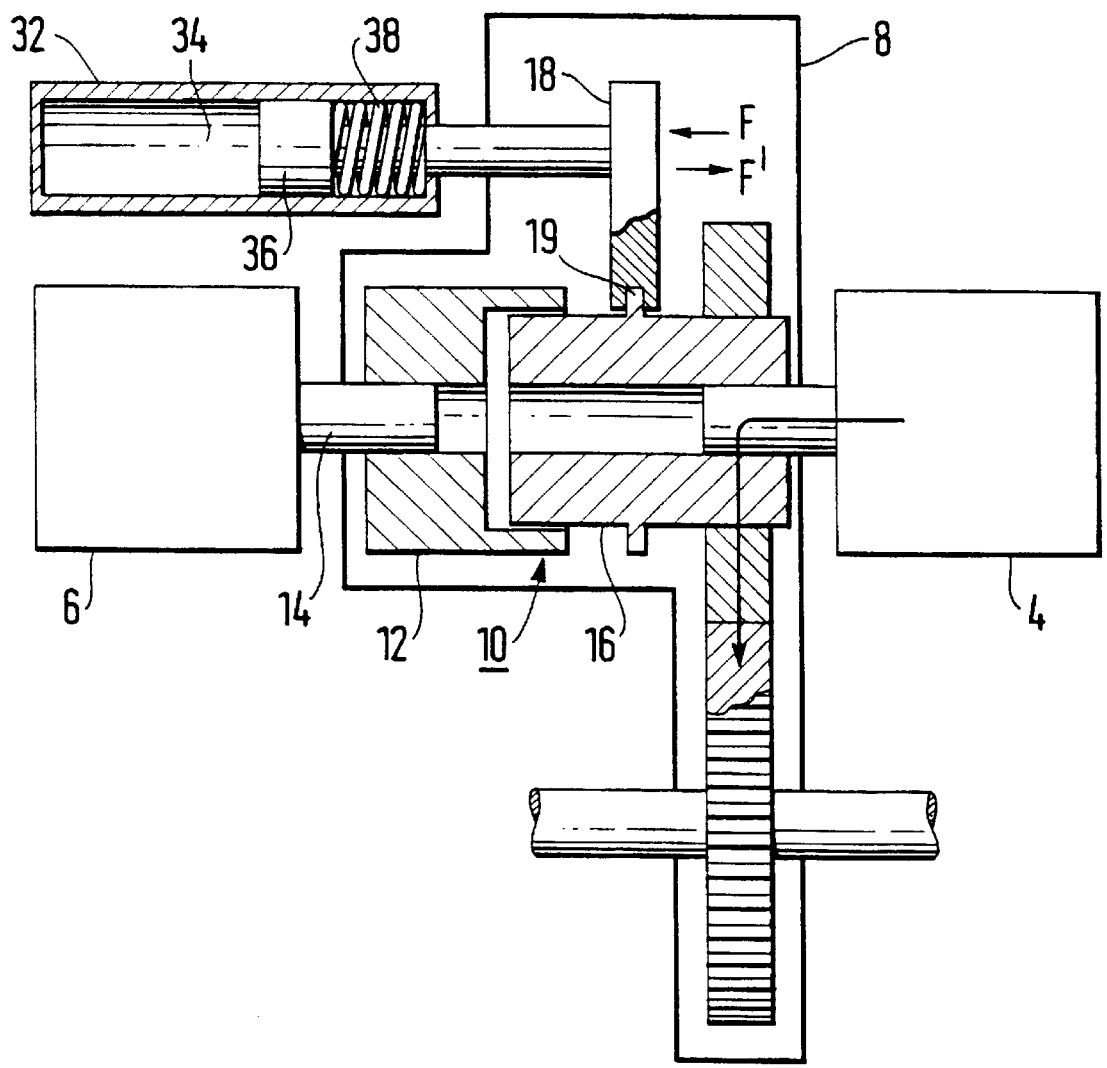

Referring to FIGS. 1 and 2, an hydraulic drive 2 comprises a first, relatively high speed, low torque hydraulic motor 4 and a second, relatively low speed, high torque hydraulic motor 6. Both of the hydraulic motors 4,6 are variable displacement motors, the displacement of the second motor 6 being capable of being varied from a maximum value down to zero.

In FIG. 1 both hydraulic motors 4,6 are shown engaged with the input side of a gearbox 8. This configuration corresponds to "low speed" operation of the hydraulic drive 2. The second hydraulic motor 6 is engaged with the gearbox 8 via a clutch 10. A first clutch plate 12, mounted to a drive shaft 14 of the motor 6, is urged against a second corresponding clutch plate 16 mounted to the input side of the gearbox 8. The clutch 10 is held in this position by a force F applied to an actuator 18, the force F being transmitted to the clutch 10 via a thrust bearing 19.

In the configuration shown in FIG. 1, the power from both of the hydraulic motors 4,6 is transmitted through the gearbox 8 to a load, for example the wheels of a wheeled excavator, which may typically be a 13 tonne or 17 tonne wheeled excavator. Preferably, the gearbox is a single ratio reduction gearbox.

When the speed of the first hydraulic motor 4 reaches a first predetermined value, the force F applied to the actuator 18 is removed, and an oppositely directed force F' is applied thereto causing the clutch plates 12,16 to separate as shown in FIG. 2, thus disconnecting the second hydraulic motor 6 from the input side of the gearbox 8. In this "high speed" mode of operation, only the first hydraulic motor 4, i.e. the high speed, low torque motor, is connected to the load, and thus no energy is lost to the second hydraulic motor 6, which is essentially redundant during high speed operation.

Once the speed of the first hydraulic motor 4 drops below a second predetermined value, being a value lower than the first predetermined value, the force applied to the actuator 18 is reversed once again, forcing the clutch plates 12,16 together, and reconnecting the second hydraulic motor 6 to the gearbox 8 and hence to the load being driven.

Figure 3:
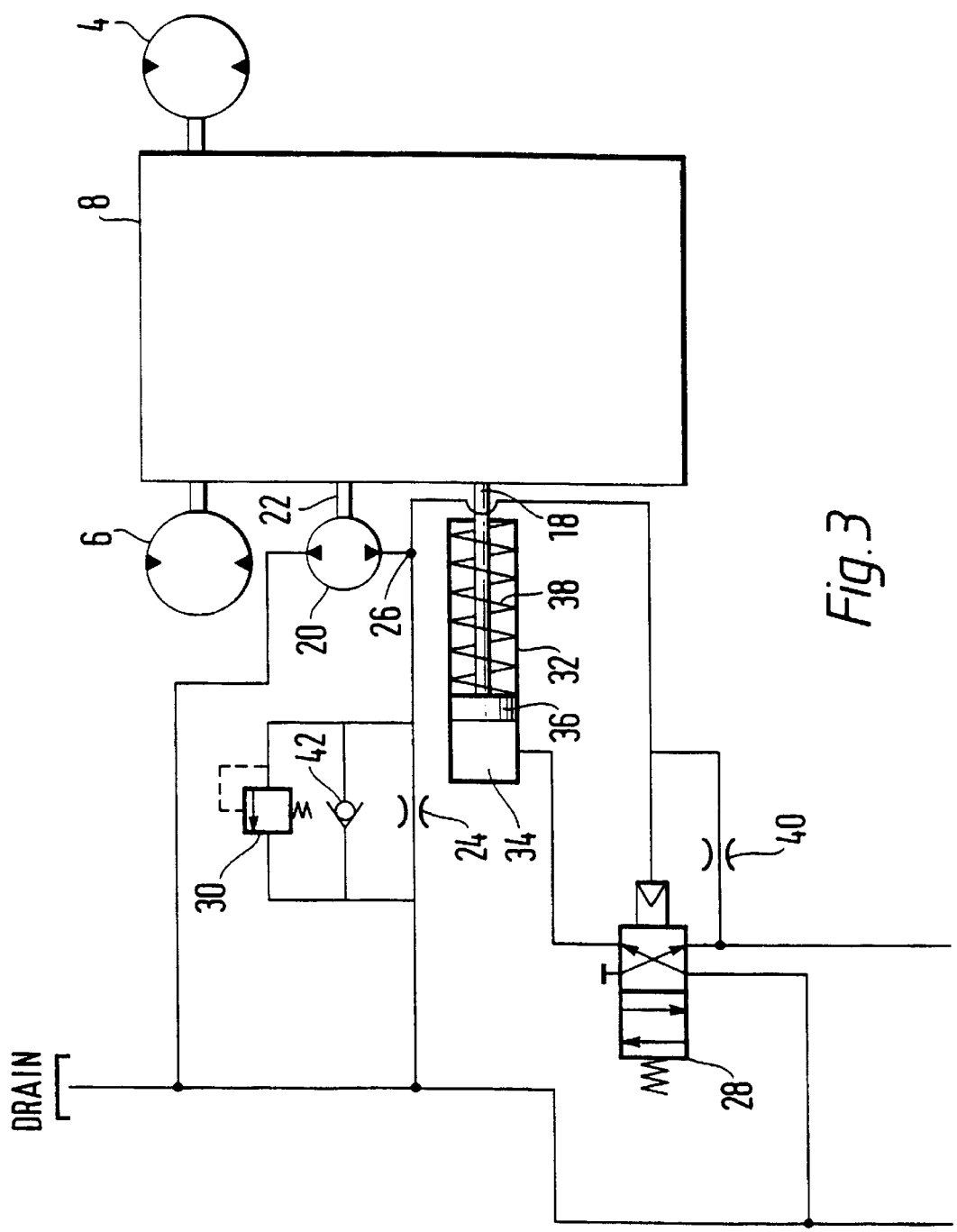
FIG. 3 shows schematically the control system of the invention.

The basis of the invention is the control means by which the second hydraulic motor 6 is disconnected from and reconnected to the load being driven, and in this respect attention is directed in particular to FIG. 3 which schematically illustrates a control system for applying the relevant force F or F' to the actuator 18.

The control system includes a pump 20 that is driven by the gearbox 8 via an output shaft 22 such that the rotational speed of the pump 20 is proportional to the speed of the first hydraulic motor 4.

The pump 20 pumps hydraulic fluid through an orifice or restriction 24 of known cross-sectional area, and a tapping 26 on the pump side of the orifice 24 is used to control the position of a two-position valve 28. A relief valve 30 is provided to limit the pressure at the orifice 24 and therefore to limit the power absorption of the control system, while a check valve 42 provides for flow during reversing of the load and thereby protects the pump 20 from cavitation.

The control valve 28 supplies (or otherwise) a hydraulic piston-cylinder arrangement 32 including a chamber 34 and a piston 36 urged by a coil spring 38 towards the left as viewed in the drawings. The piston 36 is interconnected with the actuator 18 (FIGS. 1 and 2), whereby movement of the piston 36 results in corresponding movement of the actuator 18.

With the hydraulic drive subject to low speed operation as shown in FIG. 1, the valve 28 connects the chamber 34 of the piston-cylinder arrangement 32 to drain whereby the spring 38 urges the piston 36 and attached actuator 18 to the left as viewed in the drawings to apply the force F to the clutch plate 16 thereby to retain the clutch 10 in its engaged configuration.

Thus both motors 4,6 drive the load through the gearbox 8.

As the speed of the first motor 4 increases, so does the speed of the pump 20, whereby the pressure at the location of the tapping 26 also increases. This pressure, which is applied to the valve 28, eventually reaches a predetermined value which corresponds with the speed of the motor 4 at which the drive from the motor 6 becomes redundant. At this value, the pressure of the fluid changes the position of the valve 28 such that said fluid under pressure is fed to the chamber 34 to urge the piston 36 and attached actuator 18 to the right as viewed in the drawings against the bias of the spring 38, and whereby the clutch plate 16 is disengaged from the clutch plate 12. Thus the drive from the second hydraulic motor 6 is disconnected from the load, and the high speed operational configuration of FIG. 2 is adopted.

It will thus be appreciated that disconnection of the redundant motor 6 enables all the energy from the high speed motor 4 to be applied to driving the load.

As the speed of the first hydraulic motor 4 decreases, so does the speed of the pump 20 and hence the pressure at the location of the pressure tapping 26. When this pressure falls below the operating pressure of the valve 28, this valve reverts to its first position and the clutch 10 returns to its engaged position re-introducing the motor 6 into the drive chain.

The speed of the first hydraulic motor 4 at which re-engagement of the clutch 10 occurs is arranged to be lower than that at which disengagement initially occurs, thereby to avoid the clutch continuously engaging and disengaging as would otherwise be the case if the speed of the motor 4 was hovering around the value associated with initial disengagement of the clutch 10.

For this purpose hysteresis is built into the hydraulic circuitry primarily through the presence of the orifice 40 as shown in FIG. 3.

More particularly, the control system is arranged to ensure quick actuation of the valve 28 to provide a substantially bi-stable characteristic to the clutch 10 whereby it is either fully engaged or fully disengaged. This avoids the intermediate condition of prolonged partial engagement or slippage which could result in the undesirable build-up of heat within the clutch.

As mentioned above so called deadband is also built into the control system to avoid continued clutch changes when the drive to the load is hovering about the change-over speed.

We claim:

1. A control system for an hydraulic drive, the drive comprising first and second motors (4,6) connectable to the input side of a gearbox (8), the output side of the gearbox being connected to a load whereby each of said motors (4,6) can apply a driving force to the load, one of said motors (6) being capable of selective connection to and disconnection from the load by means of a clutch (10) independently of the other motor (4) while the load is being driven, the control system being characterised by a hydraulic pump (20) driven by an output from the gearbox (8) such that the pump (20) is rotated at a speed which is proportional to the speed at which the other hydraulic motor (4) is operating, pressure-sensing means (24) for detecting the pressure of fluid displaced by said pump (20), and control means (28) for controlling the flow of fluid to an hydraulic actuator (18) interconnected with, to enable selective actuation of, the clutch (10), the arrangement being such that, when the pressure sensing means (24) detects a pressure associated with a predetermined rotational speed of the other motor (4) at which the drive from the one motor (6) becomes redundant, the control means (28) operate the hydraulic actuator (18) to disconnect the one motor (6) from the gearbox (8).

2. A control system as claimed in claim 1 and including an orifice (24) of known cross-sectional area through which fluid from the hydraulic pump (20) is displaced, the pressure of fluid on the pump side of said orifice (24) actuating said control means (28).

3. A control system as claimed in claim 1 in which the control means comprises a two position valve (28) which controls flow of fluid to the hydraulic actuator (18) which, in turn, actuates the clutch (10) to disconnect the one motor (6) from the gearbox (8) at said predetermined rotational speed of the other motor (4).

4. A control system as claimed in claim 1 incorporates hysteresis such that the one motor (6) is disconnected from the gearbox (8) when the speed of the other motor (4) reaches a predetermined first value and is reconnected when that speed drops below a second value, the second value being lower than the first value.

5. A control system as claimed in claim 1 in which the one motor (6) is a relatively low speed, high torque motor, and the other motor (4) is a relatively high speed, low torque motor.

6. A control system as claimed in claim 5 in which both motors (4,6) are variable displacement hydraulic motors, the displacement of the one motor (6) being variable from a maximum value to zero.

* * * * *